(12) United States Patent
Amidon et al.

(10) Patent No.: US 8,736,867 B1
(45) Date of Patent: May 27, 2014

(54) METHODS PROVIDING PRINT FULFILLMENT FOR DIGITAL IMAGES OVER A DIGITAL NETWORK AND RELATED SYSTEMS AND COMPUTER PROGRAM PRODUCTS

(75) Inventors: Christopher M. Amidon, Apex, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2609 days.

(21) Appl. No.: 11/314,288

(22) Filed: Dec. 21, 2005

(51) Int. Cl.
*G03B 27/52* (2006.01)

(52) U.S. Cl.
USPC ........ 358/1.15; 358/1.18; 705/26.1; 705/400; 707/999.003; 707/999.007

(58) Field of Classification Search
USPC ................. 358/1.15, 1.18; 705/26, 400, 26.1; 707/3, 7, 999.003, 999.007
See application file for complete search history.

(56) References Cited

U.S. PATENT DOCUMENTS

| | | | |
|---|---|---|---|
| 6,324,545 B1 * | 11/2001 | Morag | 707/202 |
| 6,490,567 B1 | 12/2002 | Gregory | |
| 6,564,225 B1 | 5/2003 | Brogliatti et al. | |
| 6,657,702 B1 * | 12/2003 | Chui et al. | 355/40 |
| 6,812,962 B1 | 11/2004 | Fredlund et al. | |
| 6,980,964 B1 * | 12/2005 | Cocotis et al. | 705/26 |
| 7,106,461 B2 * | 9/2006 | Kakigi et al. | 358/1.12 |
| 7,277,192 B2 * | 10/2007 | Kotani et al. | 358/1.13 |
| 7,444,354 B2 * | 10/2008 | Kaburagi et al. | 707/104.1 |
| 2002/0039141 A1 * | 4/2002 | Washisu et al. | 348/232 |
| 2002/0178078 A1 | 11/2002 | OToole | |
| 2003/0069801 A1 | 4/2003 | Che-Mponda et al. | |
| 2003/0098991 A1 | 5/2003 | Laverty et al. | |
| 2003/0154099 A1 | 8/2003 | Tuijn et al. | |
| 2003/0161003 A1 | 8/2003 | Herbert | |
| 2004/0015407 A1 | 1/2004 | Sales et al. | |
| 2004/0041819 A1 | 3/2004 | Barry et al. | |
| 2004/0095375 A1 | 5/2004 | Burmester et al. | |
| 2004/0201752 A1 | 10/2004 | Parulski et al. | |
| 2004/0260614 A1 | 12/2004 | Taratino et al. | |
| 2004/0267639 A1 | 12/2004 | McIntyre et al. | |
| 2005/0004845 A1 | 1/2005 | Vaughn | |
| 2005/0047684 A1 | 3/2005 | Baum et al. | |
| 2005/0063613 A1 | 3/2005 | Casey et al. | |
| 2005/0131765 A1 | 6/2005 | Rivera et al. | |
| 2005/0131767 A1 | 6/2005 | Heins | |
| 2005/0190400 A1 | 9/2005 | Redd et al. | |

FOREIGN PATENT DOCUMENTS

EP 0 855 687 7/1998

* cited by examiner

*Primary Examiner* — Peter K Huntsinger
(74) *Attorney, Agent, or Firm* — Withrow & Terranova, PLLC

(57) ABSTRACT

Methods of providing print fulfillment for digital images may include saving an image selection property in digital memory, saving a batching property in digital memory, and saving digital images and associated image data in digital memory. A group of the digital images that satisfy the image selection property saved in digital memory may be selected, and it may be determined if the batching property saved in digital memory is satisfied for the group of the digital images having associated image data that satisfy the image selection property. If the batching property is satisfied, a print fulfillment order may be transmitted over a digital network requesting prints of the group of the digital images. Related systems and computer program products are also discussed.

21 Claims, 3 Drawing Sheets

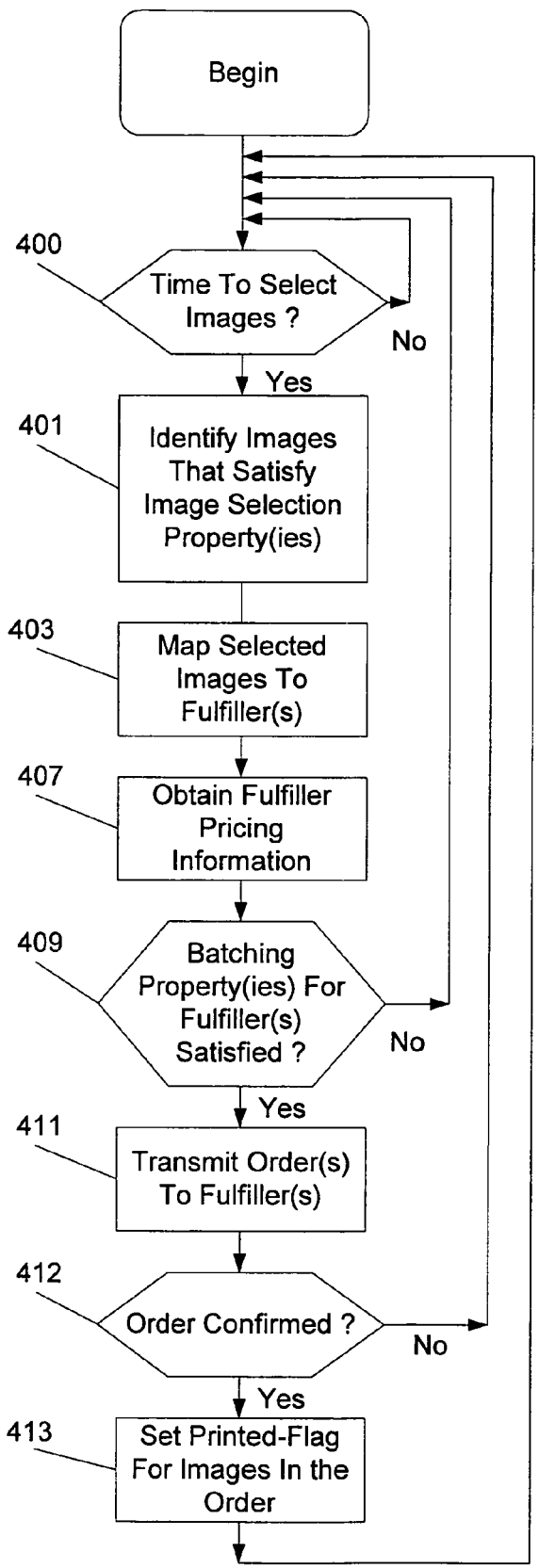

METHODS PROVIDING PRINT FULFILLMENT FOR DIGITAL IMAGES OVER A DIGITAL NETWORK AND RELATED SYSTEMS AND COMPUTER PROGRAM PRODUCTS

FIELD OF THE INVENTION

The present invention relates to the field of digital images, and more particularly, to methods of obtaining prints of digital images and related systems and computer program products.

BACKGROUND

Digital images such as digital photographs may be generated, for example, using a digital camera and stored in non-volatile memory (such as flash memory) of the digital camera. Conventionally, the digital camera and/or the non-volatile memory may be physically taken to a photo-processing lab where the digital images can be downloaded and printed. In an alternative, the digital images can be downloaded from the digital camera and/or non-volatile memory thereof to a computing device (such as a desk top computer, a laptop computer, a hand-held computer, etc.), for example, at the user's home or business. Once the digital images have been downloaded to the user's computing device, the digital images may be organized and/or printed using a printer coupled to the user's computing device. In another alternative, the digital images on the user's computing device may be transmitted over a network (such as the Internet) to a remote photo-processing lab to obtain prints of selected ones of the digital images.

As discussed, for example, in U.S. Patent Publication No. 2005/0131765, preprogrammed software running on a user's computer may enable the user of the software to easily and automatically connect with the server of a remotely located photographic service provider. The preprogrammed software greatly simplifies both the ordering of photographic goods and services from the service provider and the sharing of images with friends and family. The software provides a unified user-interface that enables a subscriber to compose an order for prints or for image sharing quickly and completely, without first establishing a communication connection from the user's computer to the service provider. Once the order has been completed off line, it will be uploaded automatically to the service provider at a pre-arranged time without requiring the further attention or action of the subscriber. The preprogrammed software also incorporates an accounting system which allows orders to be placed using previously established credit, without the necessity of carrying out a separate financial transaction for each order. The software also comprises an order database of stored pre-routed addresses that can be used for sharing of images either by email or conventional mail. As a result of combining all these steps, the user can choose images, select the people with whom they wish to share from a list of names, and by simply selecting an option to "proceed", be assured the software will automatically cause the server of the photographic service provider to carry out actions that deliver the images to the recipients via email or hard copy prints via postal mail without the sender having to perform any additional steps. At the same time the status of the user's credits in his account is updated automatically.

U.S. Patent Publication No. 2005/0004845 discusses accumulating a collection of images received from an originator in a server, where the collection of images is associated with a recipient. A printing of the images included in the collection of images is implemented when a total number of the images included in the collection of images breaches the print quantity. The disclosures of U.S. Patent Publication Nos. 2005/0131765 and 2005/0004845 are hereby incorporated herein in their entirety by reference.

Notwithstanding the methods discussed above, there continues to exist a need for improved methods, systems, and computer program products for obtaining prints of digital images.

SUMMARY

According to embodiments of the present invention, methods of providing print fulfillment for digital images may include saving an image selection property in digital memory, saving a batching property in digital memory, and saving digital images and associated image data in digital memory. A group of the digital images that satisfy the image selection property saved in digital memory may be selected. It may then be determined if the batching property saved in digital memory is satisfied for the group of the digital images. If the batching property is satisfied, a print fulfillment order may be transmitted over a digital network requesting prints of the group of the digital images.

After transmitting the print fulfillment order, a print identification may be saved in digital memory for each of the digital images of the group, and the print identification may identify a respective digital image as having been printed. Before saving the print identification for each of the digital images of the group in digital memory, user confirmation of the order may be accepted. Moreover, selecting the group of digital images may include blocking selection of a digital image for which the print identification has been saved where the image selection property for the digital image is satisfied.

Before transmitting the print fulfillment order, a request for user confirmation of the print fulfillment order may be received, and user confirmation of the print fulfillment order may be accepted responsive to receiving the request. In addition, transmitting the print fulfillment order may include transmitting the print fulfillment order after accepting user confirmation responsive to the request.

The batching property may include a price per print threshold. In addition, a current price from at least one print fulfiller may be received over the digital network. Moreover, determining if the batching property saved in digital memory is satisfied may include determining if the current price is less than or equal to the price per print threshold.

The batching property may include a batch cost threshold, and a current price may be received from at least one print fulfiller over the digital network. In addition, determining if the batching property saved in digital memory is satisfied may include determining a cost of the print fulfillment order based on the current price and the group of images selected, and determining if the batch cost threshold is satisfied by the cost of the print fulfillment order. If the batching property is not satisfied, transmitting the print fulfillment order may be blocked.

The image selection property may include a print identifier, and selecting the group of digital images may include selecting digital images from digital memory for which the associated image data includes the print identifier. The image selection property may include at least one image selection folder, and selecting the group of digital images may include selecting digital images from the image selection folder. The image selection property may include a quality of image indicator, and selecting the group of digital images may include selecting digital images that satisfy the quality of image indicator. Moreover, the image selection property, the batching property, the digital images, and the image data are saved in non-volatile digital memory.

In addition, a current price may be received from at least two different print fulfillers over the digital network, and one of the two print fulfillers having the lower price may be selected. Accordingly, the print fulfillment order may be transmitted to the selected print fulfiller.

A print fulfiller mapping property may be saved in digital memory. After selecting the group of the digital images, the selected digital images may be sorted into first and second sub-groups using the print fulfiller mapping property saved in digital memory. In addition, transmitting the print fulfillment order may include transmitting a first print fulfillment order requesting prints of the first sub-group over the digital network to a first fulfiller and transmitting a second print fulfillment order requesting prints of the second sub-group over the digital network to a second fulfiller. The fulfiller mapping property may include a print size threshold so that prints of digital images of the first sub-group are requested for a first print size or larger and prints of digital images of the second sub-group are requested for a second print size or smaller. More particularly, the first print size may be greater than the second print size. The fulfiller mapping property may include a memory folder designation so that digital images of the first sub-group are selected from a first folder of digital memory and digital images of the second sub-group are selected from a second folder of digital memory, and the first and second folders may be different. The image data may include an image quality designation for some of the digital images so that digital images with the image quality designation are sorted into the first sub-group and so that at least some digital images without the image quality designation are sorted into the second sub-group.

A plurality of delivery addresses may be saved in digital memory wherein each of a plurality of delivery identifiers is associated with a respective one or group of the delivery addresses and wherein the image data includes a delivery identifier associated with at least some of the digital images. Transmitting the print fulfillment order may include transmitting the print fulfillment order requesting delivery of a print of a first one of the group of digital images to a first one or group of the delivery addresses. Transmitting the print fulfillment order may also include requesting delivery of a print of a second one of the group of digital images to a second one or group of the delivery addresses different than the first one or group of the delivery addresses based on the delivery identifiers associated with the digital images. Moreover, a first delivery identifier may be associated with a first delivery address and not associated with a second delivery address. A second delivery identifier may be associated with the first delivery address and with the second delivery address, and the image data may include the first delivery address saved for a first digital image and the second delivery address saved for a second digital image. Transmitting the print fulfillment order may include transmitting the print fulfillment order requesting delivery of a print of the first digital image to the first delivery address and not the second delivery address and requesting deliver of prints of the second digital image to the first and second delivery addresses.

According to additional embodiments of the present invention, a computer program product may provide print fulfillment for digital images. The computer program product may include a computer readable medium having computer readable program code embodied therein. More particularly, the computer readable program code may include computer readable program code configured to save an image selection property in digital memory, and computer readable program code configured to save a batching property in digital memory. In addition, computer readable program code may be configured to save digital images and associated image data in digital memory, and computer readable program code may be configured to select a group of the digital images that satisfy the image selection property saved in digital memory. Computer readable program code may also be configured to determine if the batching property saved in digital memory is satisfied for the group of the digital images having associated image data that satisfy the image selection property, and computer readable program code may be configured to transmit a print fulfillment order over a digital network requesting prints of the group of the digital images if the batching property is satisfied.

BRIEF DESCRIPTION OF THE DRAWINGS

FIG. 4 is a flow chart illustrating operations of generating orders for print fulfillment according to embodiments of the present invention.

DETAILED DESCRIPTION

Figure 1:
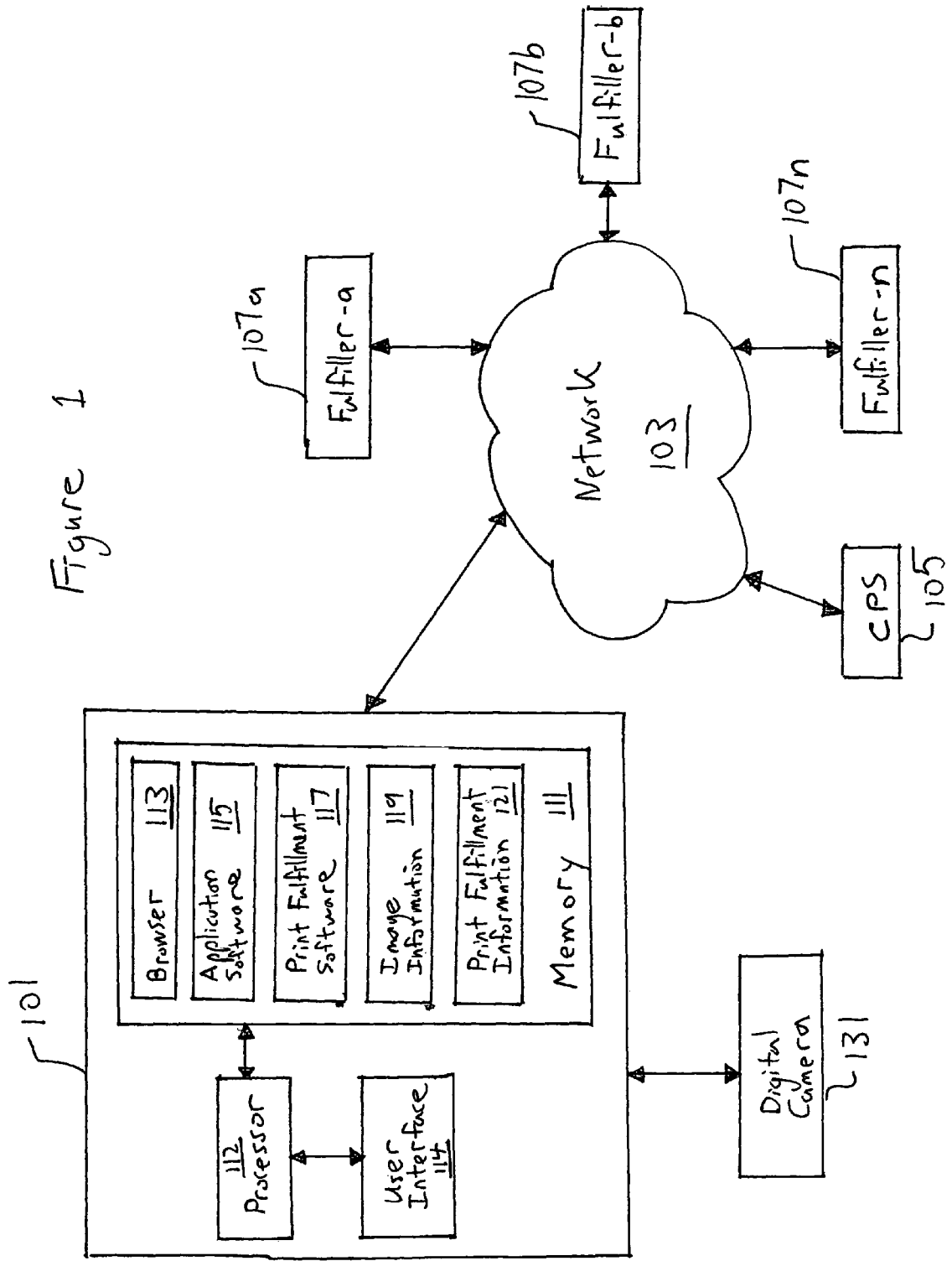
FIG. 1 is a block diagram illustrating network devices coupled through a network according to embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first multimedia device could be termed a second multimedia device, and, similarly, a second multimedia device could be termed a first multimedia device without departing from the teachings of the disclosure.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computing device (such as a computer or other programmable data processing apparatus) to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to embodiments of the present invention, print fulfillment for digital images (such as digital photographs) may be provided using a network(s) such as the Internet. As shown in FIG. 1, a user device 101 (such as a personal computer, laptop computer, hand held computer, personal digital assistant, etc.) may be coupled to a network 103 (such as the Internet). In addition, a central print server (CPS) 105 and a plurality of print fulfillers 107a-n may be coupled to the network 103. Digital images (such as digital photographs), for example, can be provided from the user device 101 over the network to one or a plurality of the print fulfillers 107a-n to obtain physical prints of the digital images. Each of the fulfillers 107a-n may be a commercial establishment with a lab equipped to produce prints of digital images, and prints may be either delivered (for example, via mail, courier service, etc.) or the prints may be held for pick-up at the fulfiller location.

According to some embodiments of the present invention, the digital images may be stored at the user device 101 with print fulfillment being handled through the central print server 105. According to other embodiments of the present invention, the digital images may be stored at the central print server 105 (or another central server). According to still other embodiments of the present invention, print fulfillment may be handled by the user device 101 without requiring a remote server. While the central print server 105 is illustrated separate from the print fulfillers 107a-n, functionality of the central print server 105 and/or portions thereof may be implemented at one or more of the print fulfillers 107a-n.

As shown in FIG. 1, the user device 101 may include a processor 112 that communicates with a memory 111 and a user interface 114. The user interface 114 may include a keyboard or keypad, a display, a speaker, a microphone, a joy stick, a mouse, and/or other input/output device(s). Moreover, one or more input/output (I/O) data ports may be included in the processor 112, for example, to provide transfer of information between the user device 101 and the network 103, between the user device 101 and a digital camera 125, and/or between the user device 101 and another user device. These components may be conventional components, such as those used in conventional data processing systems, which may be configured to operate as described herein.

Moreover, the processor 112 may communicate with the memory 111 via an address/data bus. The processor 112 can be any commercially available or custom processor, such as a microprocessor. The memory 111 is representative of the overall hierarchy of memory devices including the software and data used to implement the functionality of the user device 101. The memory 111 may include, but is not limited to, the following types of memory devices: disk, cache, ROM, PROM, EPROM, EEPROM, flash memory, SRAM, and/or DRAM.

The memory 111 may include several categories of software and data used in the user device 101: an operating system, application programs, input/output (I/O) device drivers, and data. As will be understood by those of skill in the art, the operating system may be any operating system suitable for use with a data processing system, such as AIX, or System 390 from International Business Machines Corporation; Windows 95, Windows 98, Windows 2000, or Windows XP from Microsoft Corporation; Mac OS X from Apple Computer, Inc.; Unix; or Linux. I/O device drivers typically include software routines accessed through the operating system by application programs to communicate with devices such as I/O data ports and/or memory components. Application programs, for example, may include a browser 113 used to access information over the network 103 and/or application software 115 used to organize digital image files, edit digital image files, and/or share digital image files over the network 103.

Application programs may also include print fulfillment software 117 used to request prints of digital images from one or more of fulfillers 107*a-n* using the network 103 and/or the central server 105. In addition, a data portion of the memory 111 may include static and/or dynamic data used by application programs, the operating system, I/O device drivers, and other software programs that may reside in the memory 111. In addition, non-volatile portions of the memory 111 may be used to store image information 119 and/or print fulfillment information 121. In addition, application software 115 may be used, for example, to organize digital image files, edit digital image files, and/or share digital image files over the network 103.

In addition, a digital camera 131 and/or a memory thereof may be coupled to the user device 101 and images from the digital camera 131 may be stored in memory 111 of the user device 101 as image information 119. More particularly, the digital camera 131 (and/or memory thereof) may be temporarily coupled to the user device 101, for example, using a wired coupling through a port (such as a USB port) and/or a wireless coupling (such as an infrared coupling, a WiFi coupling, and/or a Bluetooth coupling). While the digital camera 101 and the user device 101 are shown separately, functionality of the digital camera 131 may be integrated in the user device 101, and/or functionality of the user device 101 may be integrated in the digital camera 131. With functionality of the user device 101 incorporated in the digital camera 131, for example, the digital camera 131 may be linked directly to the network 103.

As discussed in greater detail below with respect to the flow charts of FIGS. 2-4, print fulfillment properties may be accepted from a user through the user interface 114, and stored in memory 111 as print fulfillment information 121. Once the print fulfillment properties have been accepted, the print fulfillment software 117 can determine whether to transmit a batch of images to one or more of the fulfillers 107*a-n* for print fulfillment based, for example, on a number of images designated for printing, the print fulfillment information 121, pricing currently available from one or more of the fulfillers 107*a-n*, image specific information provided with the images in the image information 119, etc. The central print server 105, for example, may maintain current pricing information from the different fulfillers 107*a-n*, and the print fulfillment software 117 may query the central print server 105 for the pricing information to decide whether to transmit a batch of images for printing, and if so, to which fulfiller 107*a-n*. Print fulfillment requests may be transmitted from the user device 101 to the central print server 105, with the central print server providing the request to the desired fulfiller. In other embodiments, the user device 101 may communicate directly with the fulfillers 107*a-n* so that a separate central print server 105 is not required.

While the print fulfillment software 117, the image information 119, and the print fulfillment information 121 is illustrated at the user device 101, portions or all of this software and/or information and/or the functionality thereof may be provided at the central print server 105 (or multiple remote servers). For example, images from the digital camera 131 may be downloaded to the user device 101, and the images and related information may be transmitted over the network 103 to the central print server 105 for storage. In addition, print fulfillment properties may be accepted at the user device 101 and transmitted over the network 103 to the central print server 105 for storage. Accordingly, print fulfillment software at the central print server 105 can provide print fulfillment according to embodiments of the present invention.

Accordingly, the print fulfillment software 117 can be loaded in memory 111 of the user device 101 to facilitate print fulfillment according to embodiments of the present invention. Moreover, the print fulfillment software 117 may query the user for print fulfillment properties, for example, using a graphical user interface (GUI) so that queries are provided on a display of the user interface 114 and user input is accepted through a user input device (such as a keyboard, mouse, joystick, touch sensitive screen, arrow key, etc.) of the user interface 114. In an alternative, the print fulfillment software may be provided at the central print server 105, and accessed by the user device 101 over the network 103 using the browser 113.

Figure 2:
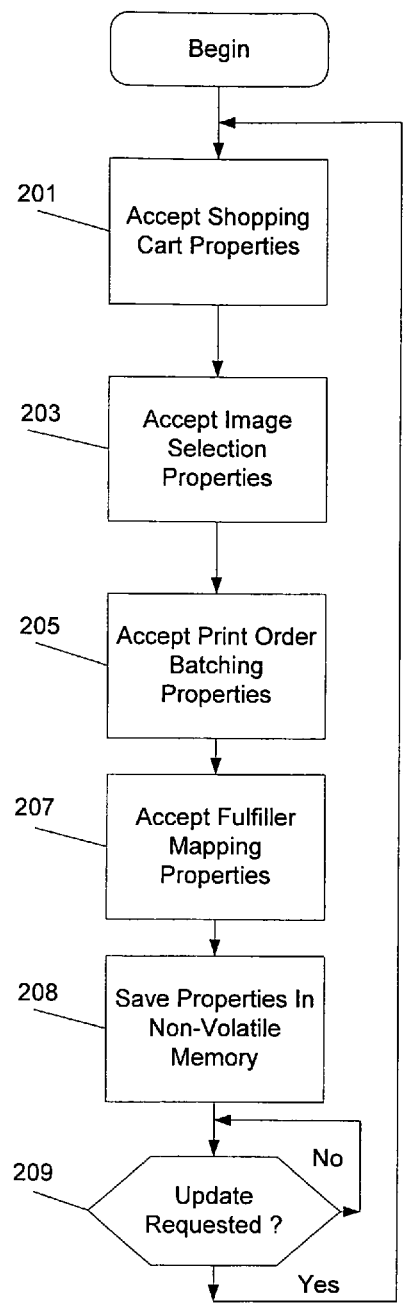
FIG. 2 is a flow chart illustrating operations of accepting print fulfillment properties according to embodiments of the present invention.

FIG. 2 is a flowchart illustrating operations of accepting print fulfillment properties such as shopping cart properties, batching properties, fulfiller mapping properties, and image selection properties. More particularly, shopping cart properties may be accepted at block 201. The shopping cart properties, for example, may include default print options, delivery options, delivery-keywords, and/or billing information. The default print options, for example, may define the size, finish, and number of prints for each image subsequently submitted for print fulfillment. The delivery options may define whether prints should be delivered or held for pick-up. If the prints should be delivered, the delivery options may include the address or addresses to which the prints should be delivered and the mode of delivery (i.e., mail, courier, etc.). The billing information may include a credit and/or debit card number and/or other account to which future print orders can be charged.

If multiple delivery addresses are provided, delivery-keywords may be associated with different addresses and/or different combinations of addresses. Accordingly, different delivery-keywords may be saved with different images in the image information 119 so that prints of different images may be delivered to different delivery addresses or combinations of addresses. By way of example, the delivery-keyword "home" could be associated with the user's home address; the delivery-keyword "work" could be associated with the user's work address; the delivery-keyword "parent" could be associated with both the user's home address and an address of the user's parent; and the delivery-keyword "group" could be associated with the user's home address and the address of each member of the group. According to this example, if the delivery-keyword "home" is saved with an image being printed, one print may be delivered to the user's home address only, or if the deliver-keyword "work" is saved with the image being printed, one print may be delivered to the user's work address. If the delivery-keyword "parent" is saved with the image being printed, one print may be delivered to the user's home address and one print may be delivered to the address of the user's parent. If the delivery-keyword "group" is saved with the image being printed, a print may be delivered user's home address and a print may be delivered to each of the addresses of the group members. Moreover, if multiple delivery-keywords, are defined, one of the deliver-keywords may be selected as a default delivery-keyword so that the default delivery-keyword is assigned to a digital image unless a user selects a different delivery-keyword for the digital image.

Image selection properties may be accepted at block 203. According to some embodiments of the present invention, the print fulfillment software 117 may periodically check the image information 119 to determine which images should be printed using the image selection properties. More particularly, the image selection properties may include one or more print identifiers such as a selection-keyword(s), one or more selection folders, a print-flag, and/or a designated quality of image. For example, a selection-keyword may be designated at block 203, and if an image is saved with a selection-keyword (for example, "print") in the image information 119, that image may be selected for printing. In addition or in an alternative, a selection-folder(s) of a memory hierarchy may be designated at block 203 so that all images saved in the selection folder may be selected for printing. A print-flag option may be enabled at block 203 so that all images designated by the print-flag may be selected for printing.

A quality of image indicator may be used for image selection so that a quality-of-image indicator (such as a resolution threshold) may be used to select images for printing. For example, a resolution threshold may be entered at block 203 so that images exceeding the resolution threshold may be selected by the print fulfillment software 117 for printing. In an alternative, a quality-rating (for example, from 1 to 5) may be saved with an image in image information 119, and a quality of image threshold may be used to determine whether an image should be selected for printing. Moreover, a quality-keyword may be used to determine whether an image should be selected for printing. For example, a quality-keyword "high" could be saved in image information 119 with images to be selected for printing and/or a quality-keyword "low" could be saved with images not to be selected for printing. Moreover, a folder could be identified for images to be selected for printing.

Print order batching properties may be accepted at block 205. Once the print fulfillment software 117 selects images that should be printed, the print order batching properties may be used to determine if the selected images should be transmitted for printing. The print order batching properties may include a batch cost threshold, batching frequency information, a price per print threshold, and/or a number of prints threshold. The batch cost threshold may be used to block transmission of a print order if an expected cost of the order exceeds the batch cost threshold. According to other embodiments, the batch cost threshold may be used to block transmission of a print order until a sufficient number of images are selected for printing so that the batch cost threshold has been exceeded. Similarly, the number of prints threshold may be used to block transmission of a print order until a number of prints selected exceeds the number of prints threshold. The batch cost threshold and/or the number of prints threshold may be used to provide that shipping costs are not incurred for an insufficient quantity of prints. The price per print threshold may be used to insure that an excessive price is not paid for a print order. The print fulfillment software 117, for example, may check a current price being charged before transmitting a print order, and the order may be blocked if the current price exceeds the price per print threshold. The batch-date may be used to provide that print orders are not placed too frequently. The batch-date, for example, may specify a given day of the week, month, quarter, etc. for print orders provided that other batching properties (e.g., the number of prints threshold is exceeded and/or the price per unit print is not exceeded) are satisfied.

If the print fulfillment software 117 is configured to generate different high and low quality print orders, different batching properties may be defined for the higher and lower quality print orders. For example, higher quality print orders may be assigned a higher price per print threshold, while lower quality printer orders may be assigned a lower price per print threshold.

Fulfiller mapping properties may be accepted at block 207. The fulfiller mapping properties may be used by the print fulfillment software 117 to determine which of the fulfillers 107*a-n* should be used for a print order. For example, different ones of fulfillers 107*a-n* may provide different print quality with the fulfiller mapping properties being used to determine which images should be routed to higher quality fulfillers and which images should be routed to lower quality fulfillers. The fulfiller mapping properties may include a print size threshold, a quality of image threshold, a quality-keyword(s), a folder name, and/or a quality flag. A print size threshold may be provided such that images designated for prints larger than the print size threshold are sent to a higher quality fulfiller while images designated for prints less than the print size threshold are sent to a lower quality fulfiller. A print size designated for an image, for example, may be the default print size provided as a shopping cart property at block 201, and the default print size for an image may be overridden if a different print size is saved with the image in image information 119.

Moreover, a quality-rating (for example, from 1 to 5) may be saved with an image in image information 119, and a quality of image threshold may be used to determine whether a high or low quality fulfiller is used based on the quality of image threshold. A quality-keyword may be selected to designate images for either a high or low quality fulfiller. For example, a quality-keyword "high" could be saved in image information 119 with images designated for high quality prints, and/or a quality-keyword "low" could be saved with images designated for low quality prints. Moreover, a folder could be identified for high quality prints and/or a folder could be identified for low quality prints. In another alternative, a quality flag could be specified such that images identified in image information with a quality flag are designated for a high quality fulfiller, with other images being designated for a low quality fulfiller.

As used herein, the term quality may refer to an objectively determined quality standard or a subjectively determined quality standard. An objectively determined quality standard may be based on a resolution of the image, a source of the image (for example, different camera types may provide different image qualities), etc. The resolution of an image, for example, may be downloaded with the image as image data, determined by the processor 112, and/or accepted as user input through the user interface 114. In another example, one camera type may be designated as providing high quality images and a second camera type may be designated as providing low quality images, and the camera type may be downloaded with the image as image data, determined by the processor 112, and/or accepted as user input through the user interface 114. A subjectively determined quality standard may be accepted as user input based, for example, on the user's personal taste and/or choice. A user, for example, may enter a quality ranking from 1 to 5 as image data for each image reflecting a subjective judgment of the image.

At block 208, the print fulfillment properties accepted at blocks 201, 203, 205, and 207 may be saved as the print fulfillment information 121 in non-volatile memory (such as a magnetic memory medium, a hard-drive, a non-volatile integrated circuit memory, a flash memory, etc.) of the memory 111. Accordingly, the print fulfillment properties may be available for future use by the print fulfillment software 117. More particularly, the print fulfillment properties may be stored in a manner that the same print fulfillment properties can be used for multiple print orders at different times without requiring reentry of the print fulfillment properties even if the power is lost at the user device between one or more of the print orders. While the block 208 is shown by way of example after the blocks 201, 203, 205, and 207, one or more of the print fulfillment properties may be saved in non-volatile memory at and/or about the time that the property is accepted and/or before accepting another of the print fulfillment properties.

At block 209, the print fulfillment software 117 may determine if any of the print fulfillment properties should be updated. A user of the device 101, for example, may initiate an update of one or more of the print fulfillment properties discussed above. Accordingly, a graphical user interface provided by the print fulfillment software 117 may accept changes in one or more of the print fulfillment properties discussed above without requiring reentry of other properties. While entry of print fulfillment properties is discussed by way of example with respect to the blocks of FIG. 2, the order of entry and/or groupings of properties may vary from that discussed above. Moreover, the print fulfillment properties discussed above are provided by way of example, and not all print fulfillment properties discussed above are required for all embodiments of the present invention, and/or additional print fulfillment may be provided according to some embodiments of the present invention.

Print fulfillment properties (as discussed above, for example, with respect to FIG. 2) may thus be accepted at the user device 101 and saved as print fulfillment information 121. The print fulfillment information can then be used by the print fulfillment software 117 to determine when to transmit images for print fulfillment and to determine which print fulfiller 107a-n should be used.

Figure 3:
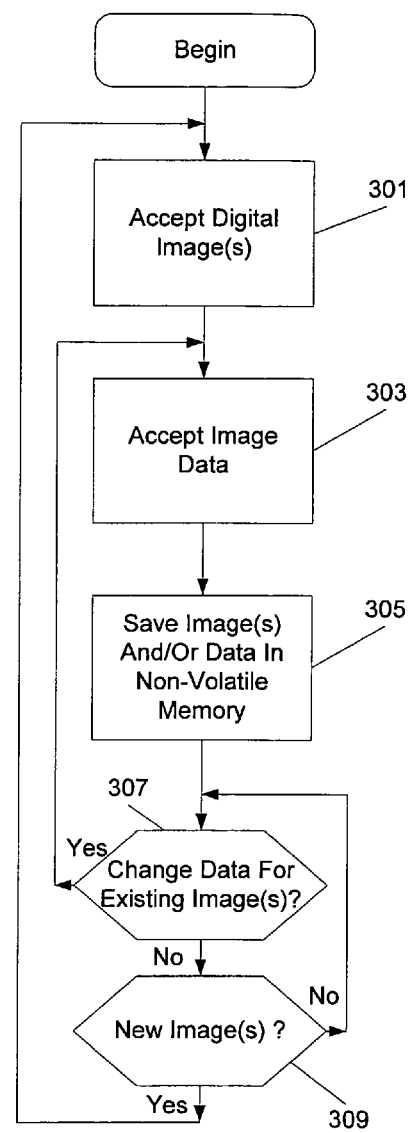
FIG. 3 is a flow chart illustrating operations of accepting digital images and image data according to embodiments of the present invention.

FIG. 3 is a flowchart illustrating operations of accepting digital images and related image data to be saved as image information 119. More particularly, one or more digital images may be accepted at block 301. By way of example, one or more digital images may be accepted from a digital camera 131 and/or memory thereof through a wired or wireless coupling such as a universal serial bus (USB) coupling, an infrared coupling, a Bluetooth coupling, etc. In addition or in alternatives, one or more digital images may be accepted, for example, from a solid state memory device such as a flash memory device or a memory stick; from a portable memory disk such as a compact disk (CD), digital video disk (DVD), or a floppy disk; from a download over the network 103; and/or as an attachment to an e-mail.

At block 303, the user device 101 may accept image data for one or more of the digital images accepted at block 301. By way of example, the image data for a digital image may be accepted together with the digital image. More particularly, some or all image data for a digital image may be assigned at the digital camera 131 (based on user input at the digital camera and/or automatically based on settings of the digital camera) and accepted by the user device 101 together with the digital image. In addition or in an alternative, some or all image data for a digital image may be assigned at the user device 101 (based on user input accepted through the user interface 114 and/or assigned automatically based on default settings at the user device 101). For example, a default setting for each element of image data may be provided by the print fulfillment software 117 or other application software, and the image data default settings may be accepted for each image data element of an image until a different image data element is accepted based on user input accepted through the user interface 114. The image data for each digital image may be populated with default settings until different image data is input by the user. While not shown in FIG. 2, default image data settings for the digital images may be accepted as an operation of accepting print fulfillment properties.

Image data for a digital image may include any information used by the print fulfillment software 117 to determine whether the respective image should be included in an order for print fulfillment, and/or the treatment of the image during print fulfillment. The image data for an image may include print options such as size, finish, and number of prints to be ordered for the digital image. As discussed above with respect to block 201, default print options may be designated at block 201 as shopping cart properties. The default print options, however, may be overridden with specific print options for individual images at block 303 of FIG. 3. In addition, a delivery-keyword may be accepted as image data at block 303 for each of the images accepted at block 301. As discussed above with respect to FIG. 2, a default delivery-keyword (such as "home") may be accepted as image data at block 303 for each digital image unless/until a user designates a different delivery-keyword for the digital image.

Image data for the digital images may also include image selection properties as discussed above with respect to block 203 of FIG. 2. One or more of the digital images accepted at block 301 can thus be designated to be printed or not printed using image selection properties accepted for that image at block 303. For example, a selection-keyword such as "print" (as discussed above with respect to block 203 of FIG. 2) may be accepted at block 303 as image data for images selected for printing. Similarly, a print-flag may be set as image data for images selected for printing. In addition, or in an alternative, a selection folder may be used to designate images for printing. For example, accepting image data at block 303 may include designating a folder within the image information 119 portion of memory 111 to which the image or a group of the images is to be saved at block 305. Moreover, one or more of the folders may be designated for printing, and one or more of the folders may be designated for non-printing. If a group of images is accepted at block 301, for example, all of the images may be directed to one folder, or individual images may be directed to different folders based on user input accepted at block 303. The image data for an image accepted at block 303 may also include a resolution of the image. The resolution of the image, for example, may be determined by the print fulfillment software and/or other application software when the image is accepted; the resolution may be provided, for example, by the digital camera; and/or the resolution may be provided as user input through the user interface 114.

Image data accepted at block 303 may also include data used to determine a fulfiller to be used when printing an image. For example, a quality-rating (such as a number from 1 to 5) could be accepted as image data for each image, with images having a quality-rating below the quality of image threshold (discussed above with respect to block 207 of FIG. 2) designated for a relatively low quality fulfiller, and with images having a quality-rating above the quality of image threshold being designated for a relatively high quality fulfiller. In an alternative, a quality-keyword (such as "high") could be accepted as image data for images designated for a high quality fulfiller, and a quality-keyword (such as "low") could be accepted as image data for images designated for a low quality fulfiller. In yet another alternative, a high quality flag could be set as image data for images designated for a high quality fulfiller, and images for which the high quality flag is not set could be designated for a low quality fulfiller. Conversely, a low quality flag could be set as image data for images designated for a low quality fulfiller, and images for which the low quality flag is not set could be designated for a high quality fulfiller.

At block 305, the digital images and the image data may be saved as the image information 119 in memory 111. More particularly, the digital images and the image data may be saved as the image information 119 in non-volatile memory (such as a magnetic memory medium, a hard-drive, a non-volatile integrated circuit memory, a flash memory, etc.) of the memory 111. Accordingly, the image information may be available for future use by the print fulfillment software 117. While the block 305 is shown by way of example after the blocks 301 and 303, one or more of a digital image and/or image data for a digital image may be saved in non-volatile memory at and/or about the time that the digital image and/or the image data is accepted. Moreover, one or more images and/or image data may be updated after acceptance. For a download of a plurality of digital images, for example, all of the images may be accepted before accepting image data for the plurality of images. In an alternative, image data for each of the images may be accepted before accepting a next image.

Accordingly, digital images and image data for the images may be accepted and saved as image information 119 as discussed above with respect to blocks 301, 303, and 305. If a user of the user device 101 wishes to change image data for one or more digital images at block 307, the operations of accepting image data and saving the image data at blocks 303 and 305 may be repeated. Because the image information 119 is stored in non-volatile memory, the image data for an image may be changed at about the time of acceptance and/or at a later time. If the digital image(s) and default image data are initially accepted and saved at blocks 301, 303, and 305, a user may choose to change one or more elements of image data for one or more images at block 307 by imputing image data through user interface 114. For example, default image data for one or more data elements may be defined for the print fulfillment software 117 when print fulfillment properties are defined as discussed above with respect to FIG. 2.

If new images are to be accepted at block 309, operations of blocks 301, 303, and 305, and/or 307 may be repeated. Accordingly, any number of downloads of digital images and/or image data may be accepted before the print fulfillment software 117 initiates a print order. Moreover, image data for a particular image may be changed any number of times before or after printing so that the image may or may not be selected for printing when a next print fulfillment order is placed. Operations of print fulfillment will be discussed in greater detail below with respect to FIG. 4.

At block 400, the print fulfillment software 117 may determine if it is time to select images, for example, using batching properties discussed above with respect to block 205 of FIG. 2. According to some embodiments of the present invention, the print fulfillment software 117 may search the image information 119 for images to be printed at times designated for print fulfillment. As discussed above with respect to block 205 of FIG. 2, the user may specify that print orders be placed on a given day of the week, month, quarter, etc. According to other embodiments of the present invention, image selection may be allowed more frequently at block 400 for example, daily or even hourly. Accordingly, time variable fulfiller prices may be more closely monitored to obtain lower pricing and/or delay between downloading images and obtaining prints can be reduced.

At block 401, the print fulfillment software 117 may identify images from image information 119 that satisfy image selection properties, for example, as discussed above with respect to block 203 of FIG. 2 and/or block 303 of FIG. 3. According to some embodiments of the present invention, a selection-keyword may be saved in image data 119 with images to be selected for printing, and/or a print-flag may be set in image data 119 with images to be selected for printing. According to some more embodiments of the present invention, images saved in folders of the image information 119 designated for printing may be selected for printing while images saved in folders not designated for printing may not be selected for printing. According to yet more embodiments of the present invention, images having a specified resolution may be selected for printing. One or more of the above identified selection properties and/or other properties may be used to identify images for printing.

As discussed below with respect to block 413, a printed-flag may be set in image information 119 for previously printed images to identify images that have been previously printed. Accordingly, images for which the printed-flag has been set may be omitted from selection at block 401 even if one or more selection properties have been satisfied. If a previously printed image should be included for consideration in subsequent print orders, the printed-flag for the image may be manually cleared by the user based on user input accepted through the user interface 114.

At block 403, each of the images selected for printing may be mapped to one of the fulfillers 107*a*-*n* using fulfiller mapping properties, for example, as discussed above with respect to block 207 of FIG. 2 and/or block 303 of FIG. 3. According to some embodiments of the present invention, a quality rating (such as a number from 1 to 5) for each image may be saved in image information 119 so that images having a quality rating above an image quality threshold are mapped to a high quality fulfiller and so that images having a quality rating below the image quality threshold are mapped to low quality fulfiller. According to some other embodiments of the present invention, a quality-keyword (such as "high") may be saved in image information 119 for images to be mapped to a high quality fulfiller, and/or a quality-keyword (such as "low") may be saved in image information 119 for images to be mapped to a low quality fulfiller. According to still other embodiments of the present invention, a high quality flag could be set in image information for images to be mapped to a high quality fulfiller, and/or a low quality flag could be set in image information for images to be mapped to a low quality fulfiller. Accordingly, images designated for higher quality prints may be grouped for a print fulfillment order to a relatively higher quality (and likely higher cost) fulfiller, while images designated for lower quality prints may be grouped for a print fulfillment order to a relatively lower quality (and likely lower cost) fulfiller.

At block 407, the print fulfillment software 117 may obtain pricing information from one or more of the print fulfillers 107*a*-*n*. Because fulfiller prices may vary over time, the pricing information obtained at the time an order is placed can be used to choose a less expensive fulfiller and/or to block a print order until a price below a previously specified threshold is available. If the print fulfillment software 117 is located at the user device 101, the print fulfillment software 117 may query one or more of the print fulfillers 107*a*-*n* directly for current pricing information, and/or the central print server 105 may maintain/obtain current fulfiller pricing information, and the print fulfillment software 117 may query the central print server 105 for the current pricing information. If the print fulfillment software 117 is maintained at the central print server 105, the central print server 105 may query one or more of the print fulfillers 107a-n for current pricing information.

For example, the print fulfillment software 117 may query multiple fulfillers of a same quality at the same time to determine a fulfiller providing a lowest price. If images have been selected for two print fulfillment orders to print fulfillers of different quality, the print fulfillment software 117 may query for pricing information from multiple fulfillers providing each quality level. In addition or in an alternative, multiple queries over time to one or a group of fulfillers with time variable prices may allow a print order to be sent at a time that a lower prices is offered (for example, when there is a special discount offered).

The print fulfillment software 117 may determine if batching properties for print orders to any of the fulfillers 107a-n have been satisfied at block 409, for example, using batching properties as discussed above with respect to block 205 of FIG. 2. If a first group of images has been selected for a first type of fulfiller (for example, a high quality fulfiller) and a second group of images has been selected for a second type of fulfiller (for example, a low quality fulfiller), different batching properties may be used to determine if the respective groups of images should be transmitted as a print fulfillment order to an appropriate one of the print fulfillers.

For each group of images selected and mapped to a same type of fulfiller, the print fulfillment software 117 may determine if the group of images equals and/or exceeds a number of prints threshold, if an appropriate fulfiller is currently offering a price that is less than or equal to a price per print threshold, and/or if a total cost of the order is equal to or exceeds a batch cost threshold. If the appropriate batching properties for an order are met, an order including the selected images may transmitted to an appropriate fulfiller at block 411. If images identified at block 401 are mapped to different fulfiller types at block 403, the different batching properties may be used for the different groups of images so that a first group of images may be included in an order transmitted at block 411 while a second group of images may be blocked. An order for print fulfillment may be blocked if any relevant batching property is not satisfied.

If any images identified at block 401 are not transmitted with an order at block 411, image data relating to these images in image information 119 may remain unchanged so that these images may be identified again in a subsequent iteration of block 401. In other words, a printed-flag for these images may not be set unless a print fulfillment order including these images is actually sent. According to some embodiments of the present invention, a printed-flag for these images may not be set until a print fulfillment order including these images is confirmed by a user, until a print fulfillment order including these images is confirmed by the fulfiller, and/or until a print fulfillment order including these images is confirmed by the central print server 105.

At block 412, the user may be required to confirm the order before the order is filled. Because the print fulfillment software 117 may be configured to generate orders automatically without the user's knowledge, a confirmation option may allow the user a last opportunity to allow or block an order before incurring the cost of printing. The central print server 105 and/or the fulfiller to which the order has been sent may send a request for confirmation via e-mail to the user, and the order may not be completed until the user affirmatively responds to the request for confirmation. If the user does not respond or if the user responds with an order cancellation, the print order may be dropped. Moreover, a password may be required in the response to further reduce the possibility that an order in inadvertently placed. In particularly, a print fulfiller 107a-n, the central print server 105, and/or the print fulfillment software 117 may require that the user respond with a password before an order for prints is processed.

According to other embodiments of the present invention, the print fulfillment software 117 may generate the request for confirmation before the order(s) is/are transmitted to the fulfiller(s). If the print fulfillment software 117 is located at the user device 101, for example, a request for confirmation and/or the response may be handled internal to the user device 101 without requiring transmission over the network 103. If the print fulfillment software 117 is located at the central print server 105, the request for confirmation may be may be transmitted as an e-mail or other message over the network 103 to the user device 101 before an order is forwarded to a respective fulfiller 107a-n.

Once an order for prints of images has been transmitted to the fulfiller and/or the order has been confirmed, a printed-flag may be set for all images in the order in image information 119 at block 413 so that the same image is not unintentionally sent out in multiple print orders. For example, the printed-flag may be set for an image in image information 119 at the time the order is sent. According to other embodiments of the present invention, the printed-flag may be set for an image in image information 119 when a request for confirmation of the order is received from the central print server 105 and/or from the fulfiller 107a-n and the order is confirmed; when a confirmation is entered at and/or received from the user device 101; and/or when an order completion message is received from the respective fulfiller 107a-n. Accordingly, the printed-flag may be automatically set when an image is printed so that the images is not inadvertently sent in multiple print orders. If a user wishes to print an image a second time, the user can clear the printed-flag for the image in the image information 119 so that the image can be selected for a later print order.

According to embodiments of the present invention, operations of blocks 400, 401, 403, 407, 409, and/or 411 may be performed by print fulfillment software 117 automatically without user intervention. Accordingly, the print fulfillment software 117 may automatically compile an order for print fulfillment based on the image information 119 and the print fulfillment information 121 for user confirmation at block 412.

According to some embodiments of the present invention, the user may have an opportunity to change image data for one or more images of the order responsive to a request for confirmation, and the order may be revised based on the changed image data before print fulfillment. For example, if any image data for any image of an order is changed responsive to a request for confirmation, the print fulfillment software may repeat one or more of operations of blocks 401, 403, 407, 409, 411, 412, and/or 413 before the print order is fulfilled.

According to some embodiments of the present invention shown in FIG. 1, the print fulfillment software 117, the image information 119, and the print fulfillment information 121 may be saved on memory 111 located at the user device 101. According to other embodiments of the present invention, the print fulfillment software 117, the image information 119, and the print fulfillment information 121 may be saved on memory at the central print server 105 with a coupling between the user device 101 and the central print server 105 being provided over the network 103 using browser 113. Accordingly, a graphical user interface of the print fulfillment software at the central print-server 105 may be provided over the network 103 at the user device 101, and user input from the user device may be provided over the network 103. According to some other embodiments of the present invention, at least one of the print fulfillment software 117, the image information 119, and/or the print fulfillment information 121 may be saved at the user device 101, and at least another of the print fulfillment software 117, the image information 119, and/or the print fulfillment information 121 may be saved at the central print server 105. According to some other embodiments of the present invention, portions one or more of the print fulfillment software 117, the image information 119, and/or the print fulfillment information 121 may be split between the user device 101 and the central print server 105.

As discussed above, keywords may be provided and used according to embodiments of the present invention to define, for example, if an image should be selected for print fulfillment, which of a plurality of print fulfillers should be used for an image, and/or where a print of an image should be delivered. According to some embodiments of the present invention, different keyword fields may be used for each image for different types of keywords, for example, so that different keyword fields are used to define if the image should be selected for print fulfillment, which of a plurality of print fulfillers should be used to print the image, and/or where a print(s) of the image should be delivered. According to other embodiments of the present invention, a single keyword field may be used for each image for different types of keywords, for example, so that a same keyword filed is used to define if the image should be selected for print fulfillment, which of a plurality of print fulfillers should be used to print the image, and/or where a print(s) of the image should be delivered. Moreover, a same keyword for an image may define a plurality of if the image should be selected for print fulfillment, which of a plurality of print fulfillers should be used to print the image, and/or where a print(s) of the image should be delivered.

In the drawings and specification, there have been disclosed exemplary embodiments of the invention. However, many variations and modifications can be made to these embodiments without substantially departing from the principles of the present invention. All such variations and modifications are intended to be included herein within the scope of the present invention, as set forth in the following claims.

That which is claimed is:

1. A method of providing print fulfillment for digital images, the method comprising:
saving an image selection property in digital memory;
saving a batching property in the digital memory;
saving the digital images and associated image data in the digital memory;
selecting a group of the digital images that satisfy the image selection property saved in the digital memory;
determining if the batching property saved in the digital memory is satisfied for the group of the digital images having the associated image data that satisfy the image selection property; and
if the batching property is satisfied, transmitting to a print fulfiller a print fulfillment order over a digital network requesting prints of the group of the digital images.

2. A method according to claim 1 further comprising:
after transmitting the print fulfillment order, saving a print identification in the digital memory for each image of the group of digital images wherein the print identification identifies a respective digital image as having been printed.

3. A method according to claim 2 further comprising:
before saving the print identification for each image of the group of digital images in digital memory, accepting user confirmation of the order.

4. A method according to claim 2 wherein selecting the group of digital images comprises blocking selection of a digital image for which the print identification has been saved where the image selection property for the digital image is satisfied.

5. A method according to claim 1 further comprising:
before transmitting the print fulfillment order, receiving a request for user confirmation of the print fulfillment order; and
accepting the user confirmation of the print fulfillment order responsive to receiving the request;
wherein transmitting the print fulfillment order comprises transmitting the print fulfillment order after accepting the user confirmation responsive to the request.

6. A method according to claim 1 wherein the batching property comprises a price per print threshold, the method further comprising:
receiving a current price from at least one print fulfiller over the digital network;
wherein determining if the batching property saved in the digital memory is satisfied comprises determining if the current price is less than or equal to the price per print threshold.

7. A method according to claim 1 wherein the batching property comprises a batch cost threshold, the method further comprising:
receiving a current price from at least one print fulfiller over the digital network; and
wherein determining if the batching property saved in the digital memory is satisfied comprises determining a cost of the print fulfillment order based on the current price and the group of images selected, and determining if the batch cost threshold is satisfied by the cost of the print fulfillment order.

8. A method according to claim 1 further comprising:
if the batching property is not satisfied, blocking transmission of the print fulfillment order.

9. A method according to claim 1 wherein the image selection property comprises a print identifier and wherein selecting the group of digital images comprises selecting digital images from the digital memory for which the associated image data includes the print identifier.

10. A method according to claim 1 wherein the image selection property comprises at least one image selection folder and wherein selecting the group of digital images comprises selecting digital images from the image selection folder.

11. A method according to claim 1 wherein the image selection property comprises a quality of image indicator and wherein selecting the group of digital images comprises selecting digital images that satisfy the quality of image indicator.

12. A method according to claim 1 wherein the image selection property, the batching property, the digital images, and the associated image data are saved in non-volatile digital memory.

13. A method according to claim 1 further comprising:
receiving a current price from at least two different print fulfillers over the digital network; and
selecting one of the at least two different print fulfillers having a lower price;

wherein transmitting the print fulfillment order comprises transmitting the print fulfillment order to the selected print fulfiller.

14. A method according to claim 1 further comprising:
saving a print fulfiller mapping property in the digital memory; and
after selecting the group of the digital images, sorting the selected digital images into first and second sub-groups using the print fulfiller mapping property saved in the digital memory;
wherein transmitting the print fulfillment order comprises transmitting a first print fulfillment order requesting prints of the first sub-group over the digital network to a first fulfiller and transmitting a second print fulfillment order requesting prints of the second sub-group over the digital network to a second fulfiller.

15. A method according to claim 14 wherein the print fulfiller mapping property comprises a print size threshold so that prints of digital images of the first sub-group are requested for a first print size or larger and prints of digital images of the second sub-group are requested for a second print size or smaller and wherein the first print size is greater than the second print size.

16. A method according to claim 14 wherein the print fulfiller mapping property comprises a memory folder designation so that digital images of the first sub-group are selected from a first folder of the digital memory and digital images of the second sub-group are selected from a second folder of the digital memory wherein the first and second folders are different.

17. A method according to claim 14 wherein the associated image data includes an image quality designation for some of the digital images so that digital images with the image quality designation are sorted into the first sub-group and so that at least some of the digital images without the image quality designation are sorted into the second sub-group.

18. A method according to claim 1 further comprising:
saving a plurality of delivery addresses in the digital memory wherein a respective one of a plurality of delivery identifiers is associated with a respective one or group of the plurality of delivery addresses and wherein the associated image data includes a delivery identifier associated with at least some of the digital images;
wherein transmitting the print fulfillment order comprises transmitting the print fulfillment order requesting delivery of a print of a first one of the group of digital images to a first one or group of the delivery addresses and requesting delivery of a print of a second one of the group of digital images to a second one or group of the delivery addresses different than the first one or group of the delivery addresses based on the delivery identifiers associated with the digital images.

19. A method according to claim 18 wherein a first delivery identifier is associated with a first delivery address, wherein the first delivery identifier is not associated with a second delivery address, wherein a second delivery identifier is associated with the first delivery address and with the second delivery address, wherein the associated image data includes the first delivery address saved for a first digital image and the second delivery address saved for a second digital image, and wherein transmitting the print fulfillment order comprises transmitting the print fulfillment order requesting delivery of a print of the first digital image to the first delivery address and not the second delivery address and requesting delivery of prints of the second digital image to the first and second delivery addresses.

20. A method according to claim 1, wherein the image selection property relates to whether or not a digital image is to be printed.

21. A method according to claim 1, wherein the image selection property relates to a quality of a digital image to be printed.

* * * * *